United States Patent
Yazawa

(10) Patent No.: US 7,626,784 B2
(45) Date of Patent: Dec. 1, 2009

(54) MAGNETIC RECORDING HEAD INCLUDING MAIN MAGNETIC POLE LAYER, RETURN PATH LAYER, AND COIL LAYER

(75) Inventor: Hisayuki Yazawa, Niigata-ken (JP)

(73) Assignee: TDK Corporation, Tokyo (JP)

( * ) Notice: Subject to any disclaimer, the term of this patent is extended or adjusted under 35 U.S.C. 154(b) by 576 days.

(21) Appl. No.: 11/524,817

(22) Filed: Sep. 21, 2006

(65) Prior Publication Data

US 2007/0070544 A1 Mar. 29, 2007

(30) Foreign Application Priority Data

Sep. 26, 2005 (JP) ............................. 2005-277817

(51) Int. Cl.
*G11B 5/127* (2006.01)
(52) U.S. Cl. ............................................... 360/125.04
(58) Field of Classification Search ............ 360/125.04, 360/125.17, 319, 323, 324
See application file for complete search history.

(56) References Cited

U.S. PATENT DOCUMENTS

2002/0078553 A1 6/2002 Sato

2007/0139819 A1* 6/2007 Yazawa et al. ............ 360/126
2007/0247749 A1* 10/2007 Bonhote et al. ............ 360/126

FOREIGN PATENT DOCUMENTS

| JP | 10-269533 | 10/1998 |
| JP | 2002-197613 | 7/2002 |
| JP | 2002-197615 | 7/2002 |
| JP | 2005-71429 | 3/2005 |
| JP | 2005-293822 | 10/2005 |

OTHER PUBLICATIONS

Office Action issued in corresponding Japanese Patent Application No. 2005-277817; issued Oct. 28, 2008.
Office Action issued in the corresponding Japanese Patent Application No. 2005-277817; filed on Mar. 18, 2008.

* cited by examiner

*Primary Examiner*—Allen T Cao
(74) *Attorney, Agent, or Firm*—Brinks Hofer Gilson & Lione

(57) ABSTRACT

A magnetic recording head is provided. The magnetic recording head comprises a main magnetic pole layer, a return path layer, and a coil layer. A facing surface faces a recording medium. A yoke layer is formed between the main magnetic pole layer and the return path layer. An extending front end portion is formed in the return path layer and the yoke layer is disposed inside the extending front end portion in a height direction. The main magnetic pole layer includes a front end and a rear end and the yoke layer is formed on the surface of the main magnetic pole layer to cover the base.

11 Claims, 9 Drawing Sheets

MAGNETIC RECORDING HEAD INCLUDING MAIN MAGNETIC POLE LAYER, RETURN
PATH LAYER, AND COIL LAYER

This application claims the benefit of Japanese Patent Application 2005-277817 filed Sep. 26, 2005, which hereby is incorporated by reference.

BACKGROUND

1. Field

The present embodiments relate to a magnetic recording head including main magnetic pole layer, return path layer, and coil layer.

2. Related Art

FIG. 6 is a perpendicular magnetic recording cross-sectional view of a configuration of a magnetic recording head in the related art disclosed in JP-A-10-269533.

A known magnetic recording head H500 shown in FIG. 6 is formed at a trailing portion (the Z1 direction in the drawing) of a nonmagnetic insulating layer 612 formed on a substrate. A configuration including a playback head for reading is disclosed in JP-A-10-269533, but the playback head is not shown in FIG. 6 to help easy understanding of the following description.

As shown in FIG. 6, in the magnetic recording head H500 in the related art, a main magnetic pole layer 524 is formed on a substrate (not shown) and a yoke layer 536 connected with the main magnetic pole layer 524 is formed.

A return path layer 521 is formed over the yoke layer 536 (in the Z1 direction). A connecting portion 521a is formed downward in the return path layer 521 (in the Z 2 direction) and magnetically connected with the yoke layer 536 at the inside of the yoke layer 536 (height direction, in the Y 2 direction).

As shown in FIG. 6, in the magnetic recording head H500, a coil layer 527 wound around the connecting portion 521a is formed between the main magnetic pole layer 524 and the return path layer 521. An insulating layer 533 is formed around the coil layer 527. FIG. 7 is a partial plan view of the magnetic recording head shown in FIG. 6.

FIG. 8 is a partial cross-sectional view of a configuration of a magnetic recording head in the related art disclosed in JP-A-2002-197613 (U.S. Pub. No. 2002/0078553). FIG. 9 is a partial plan view of the magnetic recording head shown in FIG. 8.

The magnetic recording head H600 shown in FIG. 8 is formed at a trailing portion (Z1 direction) of a nonmagnetic insulation layer 612 formed on a slider (not shown). A configuration including a reading portion is disclosed in JP-A-2002-197613 (U.S. Pub. No. 2002/0078553), but the reading portion is not shown in the drawing to help an easy understanding of the following description.

In the magnetic recording head H600, the return path layer 621 is formed by plating a strong magnetic material. The nonmagnetic insulating layer 612 is formed under (Z2 direction) and around the return path layer 621.

As shown in FIG. 8, a connecting layer 625 is formed on the surface 621a of the return path layer 621 in the inner portion than a facing surface H1a (height direction, Y2 direction).

In the surroundings of the connecting portion 625, a nonmagnetic insulating layer 626 is formed on the surfaces 621a and 612a of the return path layer and the nonmagnetic insulating layer 612, and a coil layer 627 formed of an electric conductive material is formed on the nonmagnetic insulating layer 626.

The coil layer 627 is coated with an insulating layer 632 and further covered with an insulating layer 633.

In the magnetic recording head H600 a main magnetic pole layer 624 is formed on the insulating layer 633 through the plated ground layer 624b.

A yoke layer 636 is formed on the insulating layer 633 through an inorganic insulating layer 635 and plated on the plated ground layer 636d. The rear portion 624 of the main magnetic pole layer 624 and a front portion 636b of the yoke layer 636 are magnetically connected and the rear portion 636c of the yoke layer 636 is magnetically connected with the upper surface 625a of the connecting layer 625.

The magnetic recording head H600 is coated with a protecting layer 613 formed of an inorganic-nonmagnetic insulating material or the like.

FIG. 9 is a partial plan view of the magnetic recording head H600 as described above. However, FIG. 9 illustrates only the main magnetic pole layer 624 and yoke layer 636.

As shown in FIG. 9, in the magnetic recording head H600, a rear portion 624c formed at the inside in the height direction (Y2 direction) from a base 624d formed at the main magnetic pole layer 624 gradually increases in width and overlaps the yoke layer 636.

As shown in FIG. 9, the magnetic recording head H600 is configured such that the front end 636a is disposed closer to the facing surface H1a than the base 624d formed in the main magnetic pole layer 624 and the base 624d is covered with the yoke layer 636.

In the magnetic recording head H500 disclosed in JP-A-10-269533, the plane shapes of the main magnetic pole layer 524 and yoke layer 536 are not clearly described. However, the main magnetic pole layer 524, as shown in FIG. 7, is generally configured such that the rear portion 524 formed inwardly in the height direction (Y2 direction) from the base 524b formed in the main magnetic pole layer 524 gradually increases in width and the rear portion 524c overlaps the yoke layer 636.

In JP-A-10-269533, for example, the magnetic recording head shown in FIG. 7, the positional relationship of the front end 536a of the yoke layer 536 and the base 524b of the main magnetic pole layer 524 are unclear. When the base 524d of the main magnetic pole layer 524 is disposed closer to the facing surface H1a than the front end 536a of the yoke layer 536 to improve magnetic recording efficiency by concentrating the recording field on the front end (when the yoke layer 536 is disposed as indicated with a solid line), leakage magnetic flux φm1 is generated due to magnetic saturation at the base 524b and the leakage magnetic flux φm1 is applied to the recording medium M.

When the front end 536a of the yoke layer 536 is disposed closer to the facing surface H1a than the base 524b and the base 524b is spaced from the facing surface H1a at a sufficient distance, the leakage magnetic flux φm1 can not be applied from the base to the recording medium M. However, in the magnetic recording head H500, as shown in FIG. 6, the front end 536a of the yoke layer 536 is not covered with the return path layer 521 and the magnetic flux φm2 from the yoke layer 536 is applied to the recording medium M, because the return path layer 521 extends in a line in the height direction (Y1-Y2 direction).

In other words, when the base 524b is disposed closer to the facing surface H1a than the front end 536a of the yoke layer 536 to improve recording efficiency, a recording signal in an approximate track on the recording medium M is removed by the leakage magnetic flux φm1 from the base 524b.

Alternatively, when the front end 536a of the yoke layer 536 is disposed closer to the facing surface H1a than the base 524b to prevent the leakage magnetic flux φm1 from the base 524b being applied to the recoding medium M and to effectively induce recording magnetic field at the main magnetic pole layer 524 by the yoke layer 536 (when the yoke layer 536 is disposed as indicated with a dashed line), the leakage magnetic flux φm2 from the yoke layer 536 is applied to the recording medium M because the front end 536a of the yoke layer 536 is not covered with the return path layer 521.

For example, the maintenance of recording efficiency by concentrating magnetic flux of recording magnetic field and effect of prevention of leakage magnetic field is contrary to each other, so that they were not achieved at the same time in the known magnetic recording head H500 shown in FIG. 6.

In the configuration disclosed in JP-A-2002-197613 (U.S. Pub. No. 2002/0078553), for example, in the magnetic recording head H600 shown in FIG. 8, the front end 636a of the yoke layer 636 is disposed closer to the facing surface H1a than the base 624d, as shown in FIG. 9, but the yoke layer 636 is formed at the opposite side (Z1 direction) to the return path layer 621 with respect to the main magnetic pole layer 624, as shown in FIG. 8. Therefore, the leakage magnetic flux φm2 from the yoke layer 636 is easily applied to the recording medium. Accordingly, a recording signal recorded in an approximate track on the recording medium M is removed and recording efficiency cannot be improved.

SUMMARY

The present embodiments are directed to a magnetic recording head, which may obviate one or more of the problems due to the limitations and disadvantages of the related art. For example, in a present embodiment the magnetic recording head provided is capable of maintaining high recording efficiency and improving the recording efficiency by preventing leakage magnetic field from a magnetic pole end base. In a present embodiment, a magnetic recording head includes a main magnetic pole layer and a return path layer that face each other with a predetermined distance therebetween in a film thickness direction at a facing surface that faces a recording medium. A coil layer applies a recording magnetic field to the main magnetic pole layer. A yoke layer that is magnetically connected with the main magnetic pole layer is formed between the main magnetic pole layer and the return path layer. An extending front end portion that extends toward the main magnetic pole layer is formed in the return path layer. The yoke layer is disposed inside the extending front end portion in a height direction. The main magnetic pole layer includes a front end that extends inwardly from the facing surface in the height direction with the width size of a track and a rear end that widens from a base formed inside the front end in the height direction and extends inwardly in the height direction, and the yoke layer is formed on the surface of the main magnetic pole layer facing the return path layer to cover the base.

In this embodiment, a distance between the facing surface that faces the recording medium and the front end of the yoke layer may be smaller than a distance between the facing surface that faces the recording medium and the base.

In a present embodiment, a front end face of the yoke layer slopes down to the main magnetic pole layer toward the facing surface that faces the recording medium.

The upper surface of the yoke layer may be disposed farther away from the main magnetic pole layer than the lower surface of the extending front end portion.

At least a portion of the yoke layer and at least a portion of the extending front end may face each other with a gap layer interposed between.

A perpendicular magnetic recording magnetic field may be applied to the recording medium by the recording magnetic field applied to the main magnetic pole layer so as to vertically magnetize the recording medium.

In the magnetic recording head, the yoke layer is formed between the main magnetic pole layer and return path layer, and also formed on the surface of the return path layer facing the main magnetic pole layer such that it covers the base of the main magnetic pole layer. Accordingly, leakage magnetic flux φ resulting from magnetic saturation at the base is prevented by the yoke layer and it is possible to make the magnetic flux φ of the leakage magnetic field difficult to flow into a recording medium, and also the yoke layer can be disposed relatively closer to a facing surface facing the recording medium than the base of the main magnetic pole layer although the base is disposed very far from the facing surface, so that the magnetic flux φ of the recording magnetic field is effectively induced at the front end of the main magnetic pole layer by the yoke layer. The magnetic flux φ of the recording magnetic field can be effectively concentrated on the front end and recording efficiency can be improved. Although the base of the main magnetic poly layer is disposed very far from the facing surface to improve the recording efficiency, the recording efficiency can be improved by the coil layer.

The coil layer is disposed inwardly in the height direction from the extending front end formed in the return path layer and not exposed to the facing surface.

Seen from the facing surface, the magnetic recording head of the invention is configured such that the coil layer is covered by the extending front end of the return path layer in the height direction.

Although the leakage magnetic flux φ of from the front end or the surroundings of the yoke layer flows toward the facing surface, the leakage magnetic flux φ is interrupted by the extending front end portion of the return path layer, and therefore the magnetic flux φ of the leakage magnetic field is effectively prevented from reaching the recoding medium.

Therefore, a recording signal in an approximate track is effectively protected from being removed.

In the perpendicular magnetic recording head, the recording efficiency is improved by concentrating the magnetic flux φ of the recording magnetic field on the front end of the main magnetic pole layer. The removing of a recording signal in the approximate track is effectively prevented by preventing the leakage magnetic flux φ of out of the yoke layer from reaching the recording medium, so that both the improvement in the recording efficiency and the prevention of the removing of a signal in the proximate track can be achieved at the same time.

DESCRIPTION OF THE PREFERRED EMBODIMENTS

Figure 1:
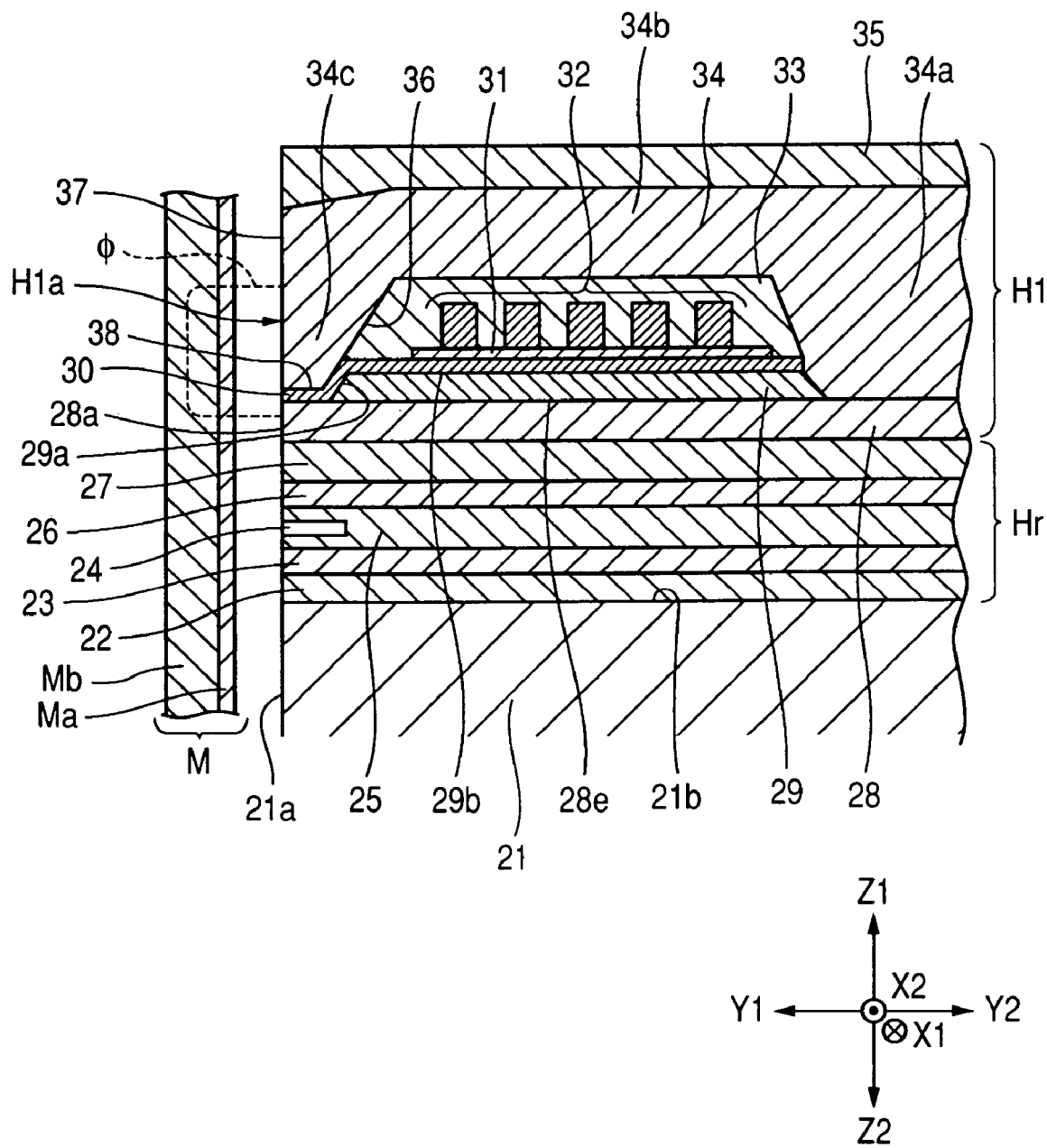
FIG. 1 is a partial perpendicular magnetic recording cross-sectional view illustrating a configuration of a perpendicular magnetic recording head according to a exemplary embodiment of a magnetic recording head.

FIG. 1 is a partial perpendicular magnetic recording cross-sectional view illustrating a configuration of a perpendicular magnetic recording head according to a first embodiment of a magnetic recording head of the invention.

A perpendicular magnetic recording magnetic recording head H1 shown in FIG. 1 applies perpendicular magnetic recording magnetic field to a recording medium M and magnetizes a hard film Ma of the recording medium M.

The recording medium may be, for example, a disc and include a hard film Ma with high coercivity on the surface and a soft film Mb with high magnetic permeability inside the hard film Ma. Further, the disc rotates about its central axis.

A slider 21 is formed of a nonmagnetic material, such as $Al_2O_3$, Ti, or the like, and a facing surface 21a faces the recording medium M. If the recording medium M rotates, the slider 21 rises from the surface of the recording medium M due to airflow on the surface or slides on the recording medium M.

A nonmagnetic-insulating layer 22 formed of an inorganic material, for example, $Al_2O_3$ or $SiO_2$, is formed on a trailing end 21b of the slider 21. A reading potion Hr is formed on the nonmagnetic-insulating layer 22.

The reading portion Hr includes a lower sealed layer 23, upper sealed layer 26, and a reading element 24 disposed in an inorganic insulating layer (gap layer) between the lower and upper layers 23 and 26. The reading element 24 is an element using magnetic resistance effect, such as AMR, GMR, TMR, or the like.

A separating layer 27 formed of an inorganic material, such as $Al_2O_3$ or $SiO_2$, is formed on the reading portion Hr and the perpendicular magnetic recording head H1 for recording is formed on the separating layer 27. A facing surface H1a of the perpendicular magnetic recording head H1 is substantially the same surface as the facing surface 21a of the slider 21.

Although the reading portion Hr is provided, only the perpendicular magnetic recording head H1 for perpendicular magnetic recording may be mounted on the trailing end of the slider 21.

A main magnetic pole layer 28 is plated on the separating layer 27 and formed by plating a magnetic material, such as a CoFeNi alloy, FeNi alloy, CoFe alloy, or the like.

A yoke layer 29 formed of a soft magnetic material, such as Permalloy (Ni—Fe) or the like, is formed on the main magnetic pole layer 28 and magnetically connected with that. The front end 29a of the yoke 29 is spaced at predetermined distance from the facing surface H1a in the height direction (that is, a Y2 direction in FIG. 1) and not exposed to the facing surface H1a.

As shown in FIG. 1, the front end 29a of the yoke layer 29 slopes down toward the facing surface H1a.

The gap layer 30 is formed from the main magnetic pole layer 28 to the yoke layer 29, for example, on a portion of the main magnetic pole layer 28 and on the yoke layer 29. A coil layer 32 is formed on a coil-insulating ground layer 31 on the gap layer 30. A coil insulating layer 33 of a resistor or the like covers up the coil layer 32.

A return path layer 34 is formed from the rear end of the main magnetic pole layer 28 throughout the facing surface H1a. The return path layer 34 is divided into three portions of a connecting portion 34a defined inwardly in the height direction and magnetically connected with the yoke layer 29 and main magnetic pole layer 28, a flat portion 34b extending from the connecting portion 34a toward the facing surface H1a, and an extending front end portion 34c (throat height portion) defined at the front (the portion facing the facing surface H1a) and extending from the flat portion 34b toward the main magnetic pole layer 28. In the embodiment shown in FIG. 1, the rear end 36 of the extending front end portion 34c slopes away from the facing surface H1a in the height direction.

At the facing surface H1a, the main magnetic pole layer 28 faces the extending front end portion 34c of the return path layer 34 in the thickness direction (Z1-Z2 direction in the drawing) through the gap layer 30, for example, at a predetermined distance.

The area of the front end 28a of the main magnetic pole layer 28 at the facing surface H1a is very small as compared with the front end 37 of the return path layer 34 at the facing surface H1a. When recording current flows into the coil layer 32, recording magnetic field is induced at the return path layer 34, yoke layer 29, and main magnetic pole layer 28 by the current flowing in the coil layer 32. The magnetic flux $\phi$ of leakage recording magnetic field concentrates on the front end 28a of the main magnetic pole layer 28 and the hard film Ma is magnetized by the concentrated magnetic flux $\phi$, whereby magnetic data is recorded.

A protect layer 35 formed of an inorganic nonmagnetic insulating material or the like is formed on the return path layer 34.

Figure 2:
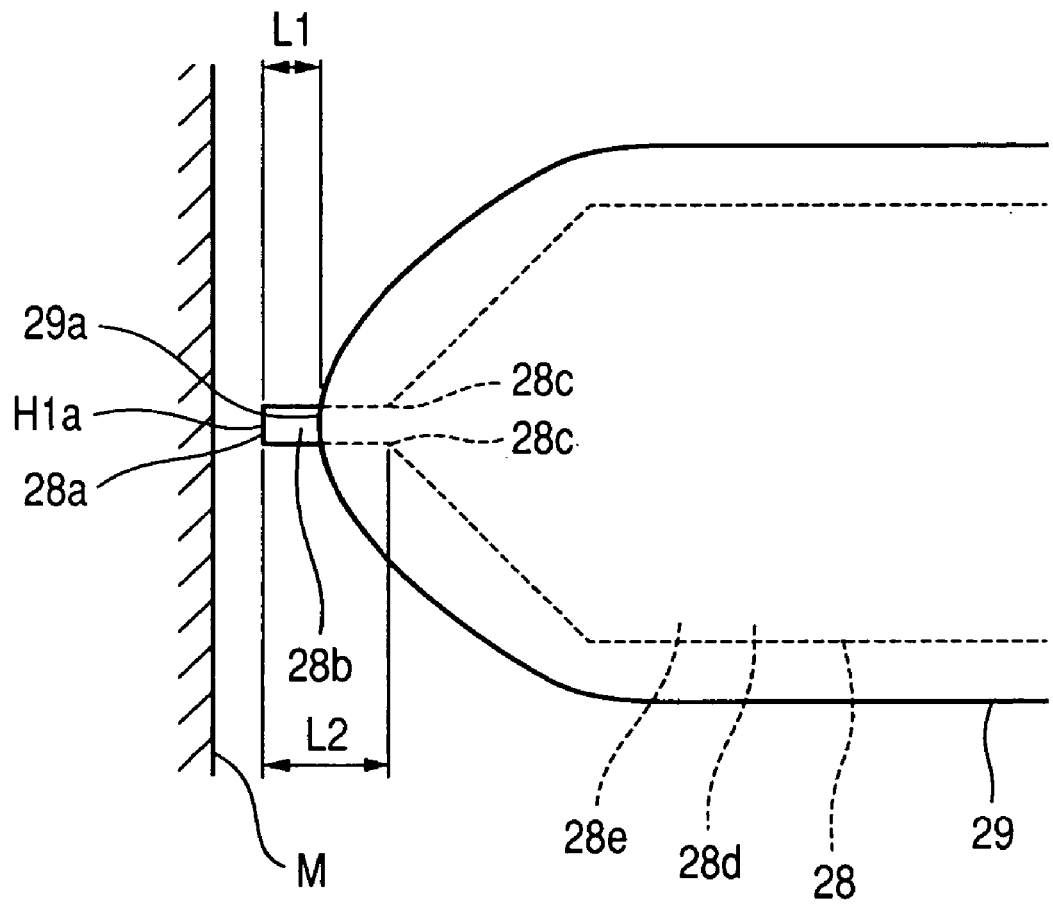
FIG. 2 is a partial plan view of the perpendicular magnetic recording head shown in FIG. 1.
Figure 2:
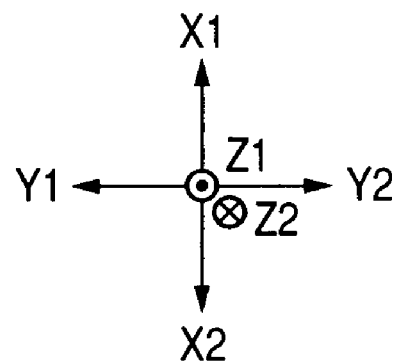

FIG. 2 is a partial plan view of the perpendicular magnetic recording head H1 shown in FIG. 1. In FIG. 2, only the main magnetic pole layer 28 and yoke layer 29 are illustrated.

As shown in FIG. 1, the yoke layer 29 is formed on the upper surface 28e, facing the return path layer, of the main magnetic pole layer 28 34 and disposed between the main magnetic pole layer 28 and return path layer 34. The front end 29a of the yoke layer 29 is disposed at the right side (in the Y2 direction) of the rear end 36 of the extending front end portion 34c in the drawing.

In the embodiment shown in FIG. 1, the upper surface 29b of the yoke layer 29 is disposed farther away from the main magnetic pole layer 28 (in the Z1 direction) than the lower surface 38 of the extending front end portion 34c.

As shown in FIG. 2, in the perpendicular magnetic recording head H1, the main magnetic pole layer 28 includes a front end 28b extending inwardly in the height direction from the facing surface H1a by the amount of track width Tw and a rear portion 28d extending from a base 28c formed at the inside of the front end 28b in the height direction, widening toward the Y2 direction.

As shown in FIG. 2, in the perpendicular magnetic recording head H1, the yoke layer 29 is formed on the upper surface 28e such that it covers the base 28c.

In the embodiment shown in FIG. 2, the space L1 from the facing surface H1a to the front end 29a of the yoke layer 29 is smaller than the space L2 from the facing surface H1a to the base 28c, so that the front end 29a of the yoke layer 29 is disposed closer to the facing surface H1a than the base 28c.

In the magnetic recording head, in general, because magnetic flux φ of recording magnetic field is effectively induced at the front end 28b of the main magnetic pole layer 28, recording efficiency is improved by concentrating the magnetic flux φ of the recording magnetic field on the front end 28b. Therefore, in order to concentrate the magnetic flux φ of the recording magnetic field on the front end 28b, the base 28c should be disposed as close as possible to the facing surface H1a.

If the base 28c is too close to the facing surface H1a, leakage magnetic field flows from the base 28c to the recording medium M and removes a recording signal in a recording track approximate to the base 28c.

Alternatively, if the base 28 is disposed far from the facing surface H1a, it is possible to prevent the removing of a recording signal caused by leakage magnetic field. When the base 28 is disposed far from the facing surface H1a, magnetic saturation is remarkable at the front end 28b of the main magnetic pole layer 28. It is difficult to enlarge the effect resulting from concentrating the magnetic flux φ of the recording magnetic field on the recording medium M and consequently recording efficiency can not be improved.

Accordingly, a trade-off is established between the improvement in the recording efficiency of the main magnetic pole layer 28 and the removing of the recording signal in the approximate track. When only the main magnetic pole layer is designed, both the improvement in the recording efficiency and the prevention of the removing of the recording signal in the proximate track can not be achieved at the same time.

In the perpendicular magnetic recording head H1 shown in FIG. 1 and FIG. 2, as described above, the yoke layer 29 is formed on the upper surface 28e such that it covers the base 28c.

In the base 28c, while possible to prevent the magnetic flux φ of the leakage magnetic field caused by the magnetic saturation using the yoke layer 29, it is possible to make the magnetic flux φ of the leakage magnetic field difficult to flow into the recording medium. The yoke layer 29 can be disposed relatively close to the facing surface H1a as compared with the main magnetic pole layer 28 even though the base 28c is disposed far from the facing surface H1a, so that the magnetic flux φ of the recording magnetic field induced at the rear portion of the main magnetic pole layer 28 can be effectively induced at the front end 28b of the main magnetic pole layer 28 using the yoke layer 29. The recording efficiency can be improved because the magnetic flux φ of the recording magnetic field is effectively concentrated on the front end 28b. Although the base 28c of the main magnetic pole layer 28 is disposed far from the facing surface H1a to improve the recording efficiency, the recording efficiency can be improved by the yoke layer 29.

In the perpendicular magnetic recording head H1, as shown in FIG. 1, the front end 29a of the yoke layer 29 is disposed, in the height direction, inside the extending front end portion 34c defined in the return path layer 34, and thus the front end 29a is not exposed to the facing surface H1a.

Seen from the facing surface H1a, the perpendicular magnetic recording head H1 is configured such that the front end 29a of the yoke layer 29 is covered, in the height direction, inside the extending front end portion 34c of the return path layer 34.

Although the magnetic flux φ of the leakage magnetic field from the front end 29a or the surroundings of the yoke layer 29 flows toward the facing surface H1a, the magnetic flux φ of the leakage magnetic field is interrupted by the extending front end portion 34c, and therefore the magnetic flux φ of the leakage magnetic field is effectively prevented from reaching the recoding medium M.

Therefore, a recording signal in the approximate track is effectively protected from being removed.

In the perpendicular magnetic recording head H1, the recording efficiency is improved by concentrating the magnetic flux φ of the recording magnetic field on the front end 28b of the main magnetic pole layer 28 and the removing of a recording signal in the approximate track is effectively prevented by preventing the magnetic flux φ of the leakage magnetic field out of the yoke layer 29 from reaching the recording medium M, so that both the improvement in the recording efficiency and the prevention of the removing of a signal in the proximate track can be achieved at the same time. The front end 29a of the yoke layer 29 is disposed closer to the facing surface H1a than the base 28c.

The magnetic flux φ of the recording magnetic field can be effectively concentrated on the front end 28b of the main magnetic pole layer 28 and the recording efficiency can be effectively improved because the front end 29a of the yoke layer 29 is disposed closer to the facing surface H1a than the base 28c and the yoke layer 29 covers a portion of the front end 28b of the main magnetic pole layer 28 (in the Z1 direction).

In the perpendicular magnetic recording head H1, because the upper surface 29b of the yoke layer 29 is disposed far from the main magnetic pole layer 28 than the lower surface 38 of the extending front end portion 34c (in the Z1 direction), the magnetic flux φ of the leakage magnetic field is easily interrupted by the extending front end portion 34c, thereby effectively preventing the magnetic flux φ of the leakage magnetic field from reaching the recording medium M.

As shown in FIG. 1, the front end 29a of the yoke 29 slopes down toward the main magnetic pole layer 28 as described above. The magnetic flux φ of the recording magnetic field induced at the yoke layer 29 is effectively transmitted to the main magnetic pole layer 28 and the recording efficiency is very effectively achieved.

When the front end 29a slopes, the gap layer 30 may be easily formed in a uniform thickness.

Figure 3:
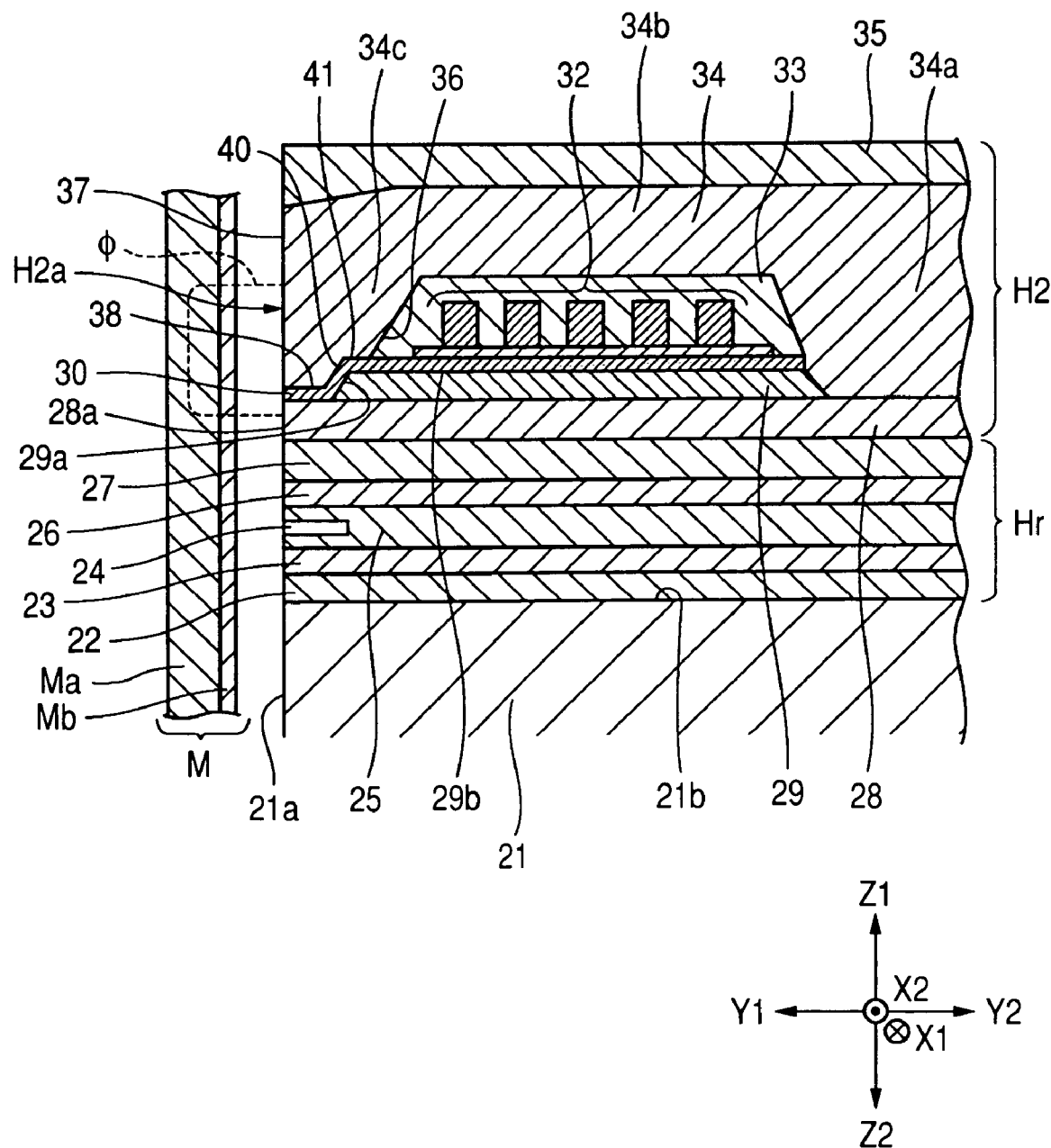
FIG. 3 is an exploded perpendicular magnetic recording cross-sectional view showing a configuration of a perpendicular magnetic recording head according an exemplary embodiment of a magnetic recording head.

FIG. 3 is an exploded perpendicular magnetic recording cross-sectional view showing a configuration of a perpendicular magnetic recording head according a second embodiment of a magnetic recording head on the invention.

A perpendicular magnetic recording head H2 shown in FIG. 3 includes the same components as the perpendicular magnetic recording head H1 shown in FIG. 1. Therefore, in the perpendicular magnetic recording head H2, the same components as in the perpendicular magnetic recording head H1 are designated by the same reference numerals and not described below.

The perpendicular magnetic recording head H2 shown in FIG. 3 is different from the perpendicular magnetic recording head H1 shown in FIG. 1 as for the shape of the extending front end portion 34c defined in the return path layer 34. As shown in FIG. 3, at a facing surface H2a, the main magnetic pole layer 28 faces the extending front end portion 34c of the return path layer 34 through the gap layer 30, that is, at a predetermined distance in the film thickness direction (Z1-Z2 direction). In the perpendicular magnetic recording head H2, a facing portion 41 is, as shown in FIG. 3, formed at the extending front end portion 34c through a stepping surface 40. The facing portion 41 and yoke layer 29 face each other in the film thickness direction (Z1-Z1 direction).

As described above, because the return path layer 34 may be close to and face the upper surface 29b of the yoke layer 29 in the configuration where the facing portion 41 is formed at the front end portion 34c and faces the yoke layer 29 in the film thickness direction, the leakage magnetic flux φ from the yoke layer 29 can be effectively interrupted at the extending front end portion 34c of the return path layer 34.

Figure 4:
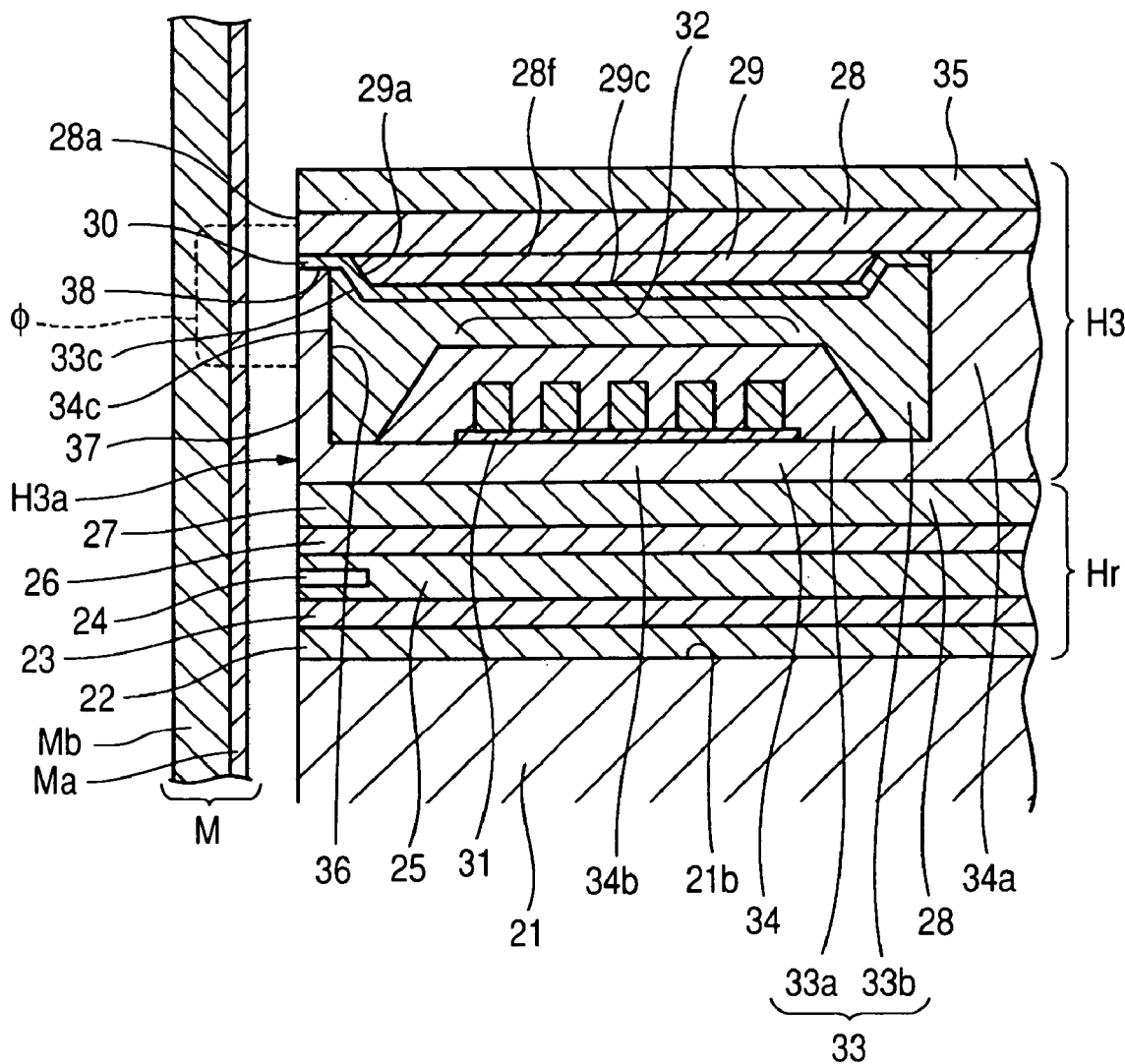
FIG. 4 is an exploded perpendicular magnetic recording cross-sectional view illustrating a configuration of a perpendicular magnetic recording head according to an exemplary embodiment of a magnetic recording head.
Figure 4:
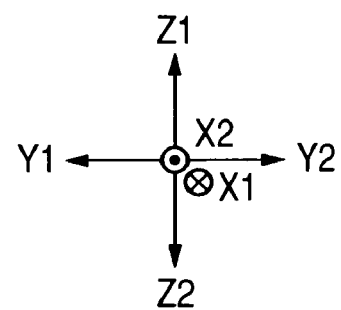

FIG. 4 is an exploded perpendicular magnetic recording cross-sectional view illustrating a configuration of a perpendicular magnetic recording head according to a third embodiment of a magnetic recording head of the invention.

A perpendicular magnetic recording head H3 shown in FIG. 4 includes the same components as the perpendicular magnetic recording head H1 shown in FIG. 1. In the perpendicular magnetic recording head H3, the same components as in the perpendicular magnetic recording head Hi shown in FIG. 1 are designated by the same reference numerals and not described below.

The perpendicular magnetic recording head H3 shown in FIG. 4 has a difference from the perpendicular magnetic recording head H1 shown in FIG. 1 that the main magnetic pole layer 28, yoke layer 29, gap layer 30, coil layer 32, and return path layer 34 are formed upward (Z1-Z2 direction on the separating layer 27 (in the Z1 direction in FIG. 1) in the reverse order).

For example, as shown in FIG. 4, the perpendicular magnetic recording head H3 is configured such that the return path layer 34, coil insulating ground layer 31, coil layer 32, coil insulating layer 33, gap layer 30, yoke layer 29, and main magnetic pole layer 28 are formed on the separating layer 27 in sequence from the bottom.

In the embodiment shown in FIG. 4, the coil insulating layer 33 is composed of the organic material layer 33a covering the coil layer 32 and the inorganic material layer 33b formed on the organic material layer 33a. When the coil layer 32 is covered with the organic material layer 33a as described above, porosities around the coil layer 32 are prevented.

As shown in FIG. 4, at the facing surface H3a of the inorganic material layer 33b included in the coil layer 33, a slope 33c is formed such that it slopes away from the surface (in the height direction, that is, the Y2 direction) as going down (the z2 direction).

Figure 5:
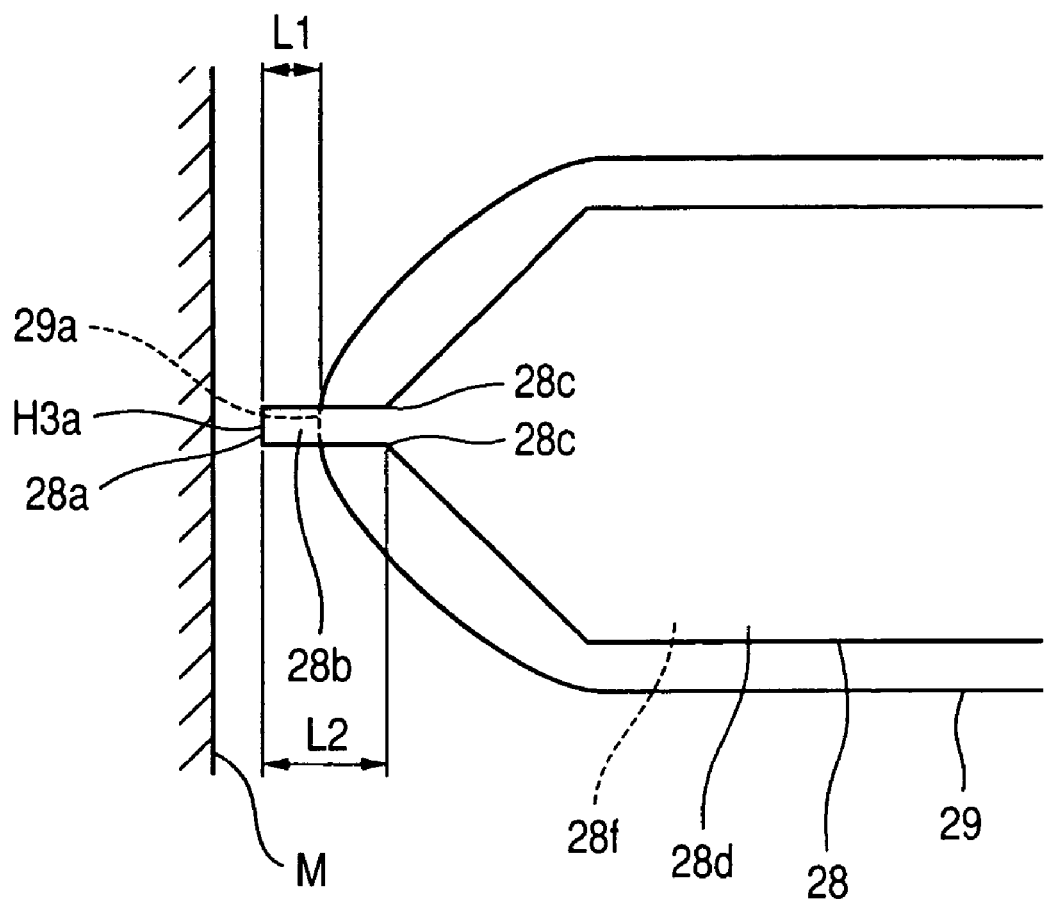
FIG. 5 is a partial plan view of the perpendicular magnetic recording head H3 shown in FIG. 4.
Figure 5:
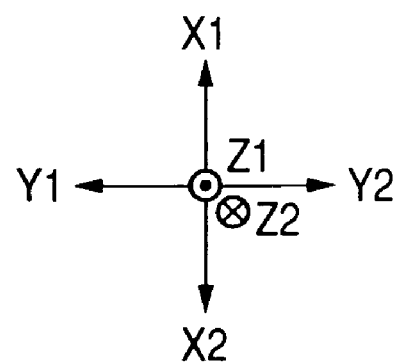
Figure 6:
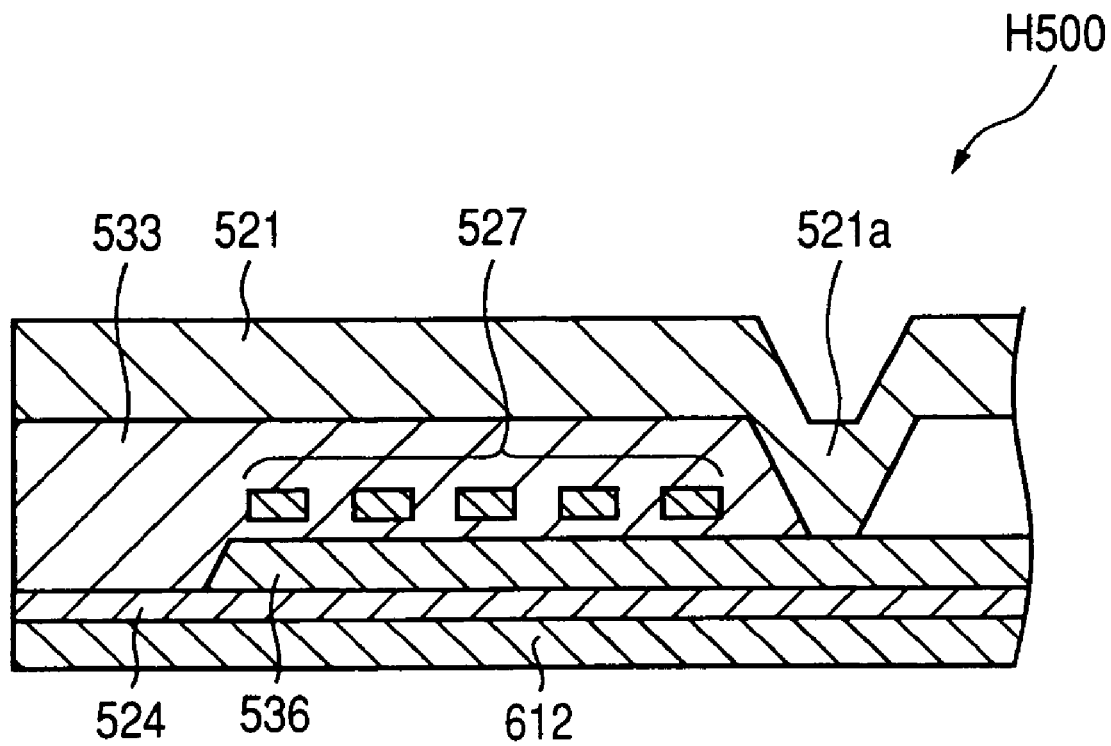
FIG. 6 is a perpendicular magnetic recording cross-sectional view of a configuration of a magnetic recording head in the related art.
Figure 6:
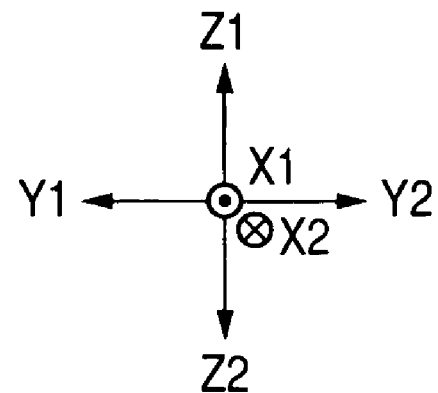
Figure 7:
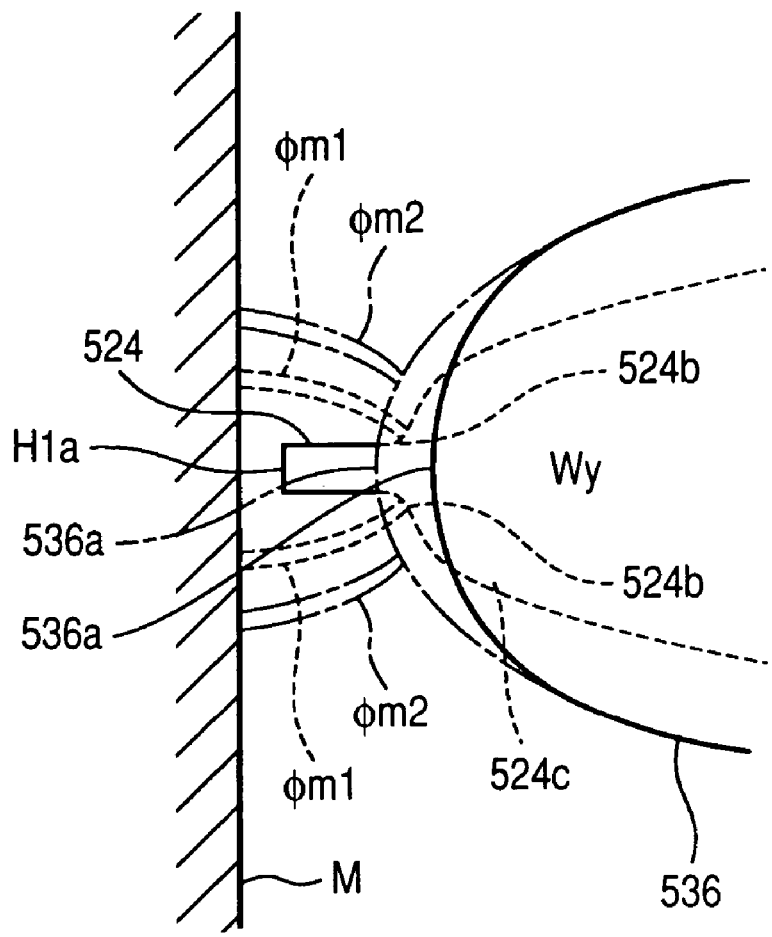
FIG. 7 is a partial plan view of the perpendicular magnetic recording head shown in FIG. 6.
Figure 7:
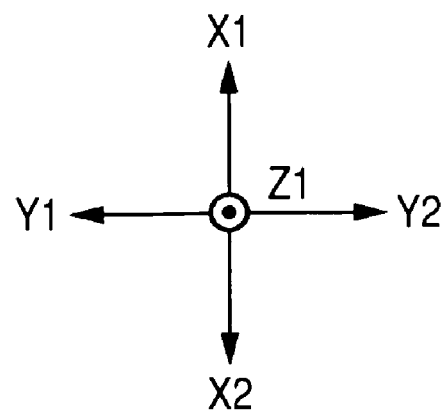
Figure 8:
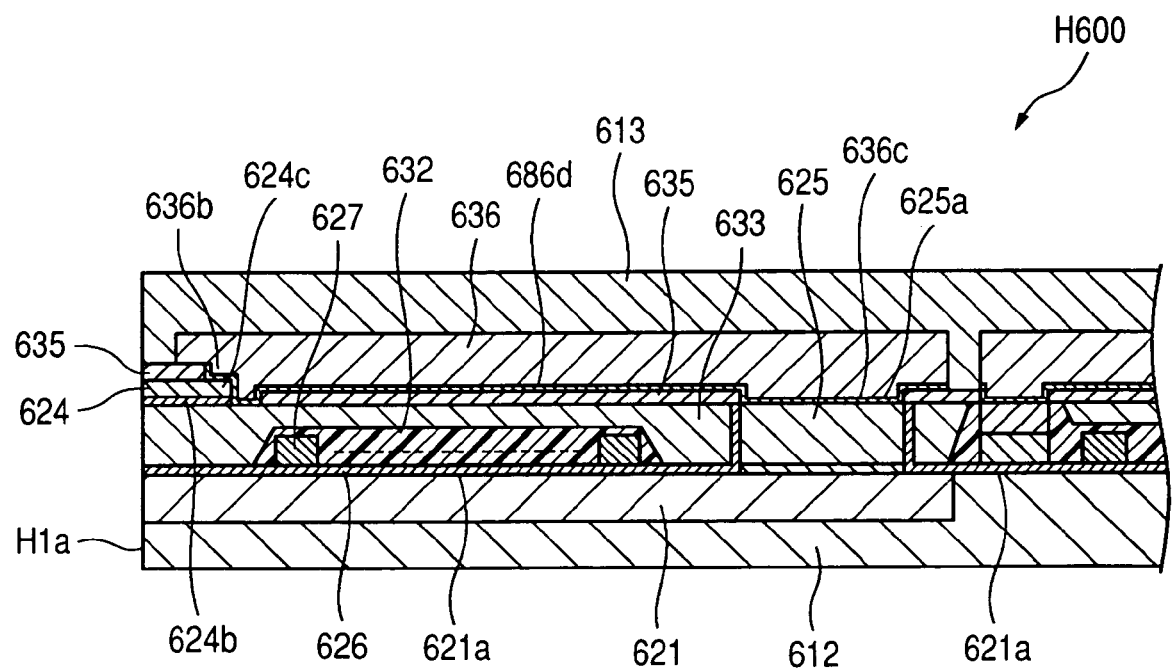
FIG. 8 is a partial perpendicular magnetic recording cross-sectional view showing a configuration of a magnetic recording head in the related art.
Figure 8:
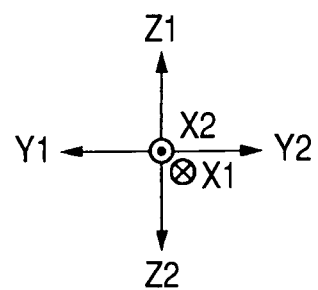
Figure 9:
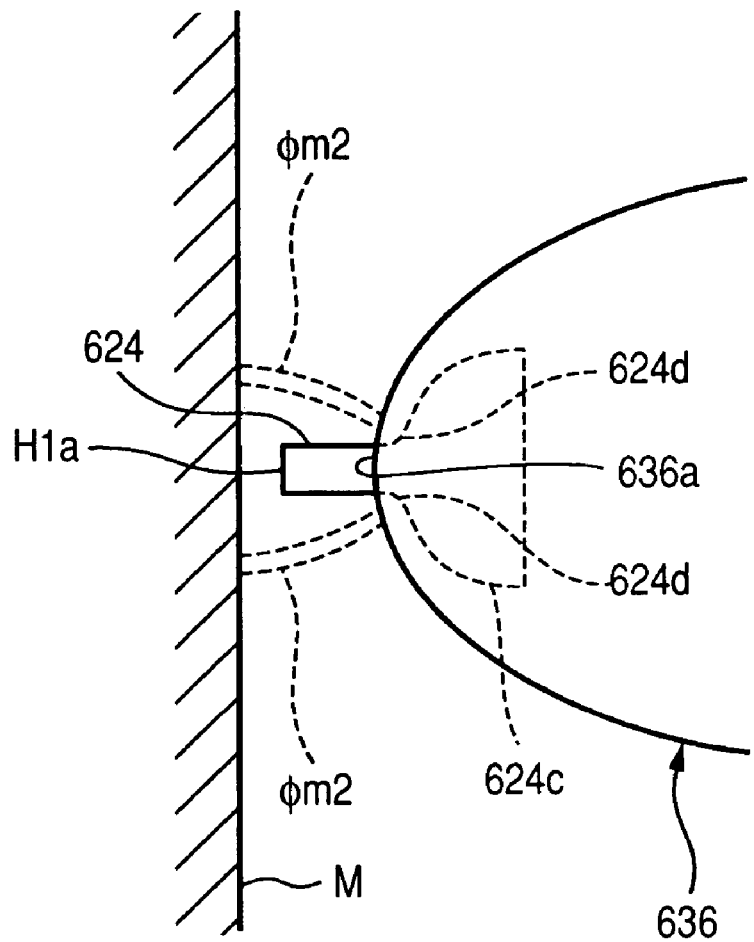
FIG. 9 is a partial plan view of the perpendicular magnetic recording head shown in FIG. 8.
Figure 9:
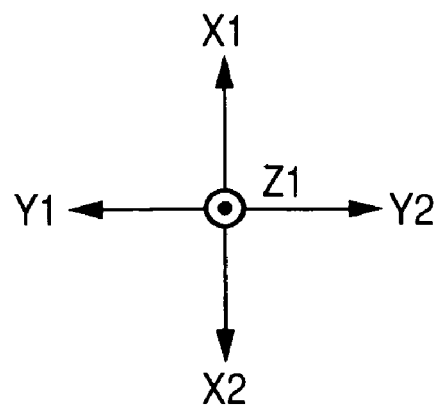

FIG. 5 is a partial plan view of the perpendicular magnetic recording head H3 shown in FIG. 4. In FIG. 5, only the main magnetic pole layer 28 and yoke layer 29 are illustrated to help an easy understanding of the structure of the perpendicular magnetic recording head H3.

As shown in FIG. 4, the yoke layer 29 is formed under the lower surface 28f facing the return path layer 34, that is, between the main magnetic pole layer 28 and return path layer 34. Further, the front end 29a of the yoke layer 29 is disposed farther away from the facing surface H3a than the rear end 36 of the extending front end portion 34c in the height direction (the Y2 direction).

As shown in FIG. 4, the lower surface 29c of the yoke layer 29 is disposed farther away from the main magnetic pole layer 28 (in the Z2 direction) than the lower surface 38 of the extending front end portion 34c.

As shown in FIG. 5, in the perpendicular magnetic recording head H3, the main magnetic pole layer 28 also includes a front end 28b extending inwardly from the facing surface H3a in the height direction by the amount of track width Tw and a rear portion 28d extending inwardly from the base 28c formed at the front end 28b in the height direction, widening wider toward the Y2 direction.

As shown in FIG. 5, the yoke layer 29 is formed on the lower surface 28f such that it covers the base 28c.

In the embodiment shown in FIG. 5, the space L1 from the facing surface H3a to the front end 29a of the yoke layer 29 is smaller than the space L2 from the facing surface H3a to the base 28c, so that the front end 29a of the yoke layer 29 is disposed closer to the facing surface H1a than the base 28c.

In the perpendicular magnetic recording head H3 shown in FIG. 4 and FIG. 5, as described above, the yoke layer 29 is also formed on the lower surface 28f such that it covers the base 28c.

In the base 28c, while possible to prevent the magnetic flux φ of the leakage magnetic field caused by the magnetic saturation using the yoke layer 29, it is possible to make the magnetic flux φ of the leakage magnetic field difficult to flow into the recording medium, and also the yoke layer 29 can be disposed relatively close to the facing surface H3a as compared with the main magnetic pole layer 28 even though the base 28c is disposed far from the facing surface H3a, so that the magnetic flux φ of the recording magnetic field induced at the rear portion of the main magnetic pole layer 28 can be effectively induced at the front end 28b of the main magnetic pole layer 28 using the yoke layer 29. Therefore, the recording efficiency can be improved because the magnetic flux φ of the recording magnetic field is effectively concentrated on the front end 28b. As a result, although the base 28c of the main magnetic pole layer 28 is disposed far from the facing surface H3a to improve the recording efficiency, the recording efficiency can be improved by the yoke layer 29.

In the perpendicular magnetic recording head H3, as shown in FIG. 4, the front end 29a of the yoke layer 29 is disposed, in the height direction, inside the extending front end portion 34c defined in the return path layer 34, thus the front end 29a is not exposed to the facing surface H3a.

As seen from the facing surface H3a, the perpendicular magnetic recording head H3 is configured such that the front end 29a of the yoke layer 29 is hided, in the height direction, inside the extending front end portion 34c of the return path layer 34.

Although the magnetic flux φ of the leakage magnetic field from the front end 29a or the surroundings of the yoke layer 29 flows toward the facing surface H3a, the magnetic flux φ of the leakage magnetic field is interrupted by the extending front end portion 34c, and therefore the magnetic flux φ of the leakage magnetic field is effectively prevented from reaching the recoding medium M. Therefore, a recording signal in the proximate track is effectively protected not to be removed.

In the perpendicular magnetic recording head H3, the recording efficiency is improved by concentrating the magnetic flux φ of the recording magnetic field on the front end 28b of the main magnetic pole layer 28 and the removing of a recording signal in the approximate track is effectively prevented by preventing the magnetic flux φ of the leakage magnetic field out of the yoke layer 29 from reaching the recording medium M, so that both the improvement in the recording efficiency and the prevention of the removing of a signal in the proximate track can be achieved at the same time.

The front end 29a of the yoke layer 29 is disposed closer to the facing surface H3a than the base 28c.

The magnetic flux φ of the recording magnetic field can be effectively concentrated on the front end 28b of the main magnetic pole layer 28 and the recording efficiency can be effectively improved because the front end 29a of the yoke layer 29 is disposed closer to the facing surface H3a than the base 28c and the yoke layer 29 covers a portion of the front end 28b of the main magnetic pole layer 28 (in the Z2 direction).

In the perpendicular magnetic recording head H3, because the lower surface 29c of the yoke layer 29 is disposed far from the main magnetic pole layer 28 than the lower surface 38 of the extending front end portion 34c (in the Z2 direction), the magnetic flux φ of the leakage magnetic field is easily interrupted by the extending front end portion 34c, thereby effectively preventing the magnetic flux φ of the leakage magnetic field from reaching the recording medium M.

As shown in FIG. 4, the front end 29a of the yoke 29 slopes down toward the main magnetic pole layer 28 as described above. Accordingly, the magnetic flux φ of the recording magnetic field induced at the yoke layer 29 is effectively transmitted to the main magnetic pole layer 28 and the recording efficiency is very effectively achieved.

The gap layer 30 may be formed in a uniform thickness on the coil layer 33 because of the slope 33c in the coil layer 33.

Similar to the perpendicular magnetic recording head H2 shown in FIG. 2, in the perpendicular magnetic recording head H3 shown in FIG. 4, the stepping surface 40 and facing portion 41 are also formed at the extending front end potion 34c of the return path layer 34 and the facing portion 41 may face the lower surface 29c of the yoke layer 29.

The return path layer 34 may be formed on and under the main magnetic pole layer 28 and the yoke layer 29 may be formed between the return path layer 34 and the main magnetic pole layer 28, and also the other configurations may be the same as in the perpendicular magnetic recording head H1, H2, and H3 shown in FIG. 1 or FIG. 5.

The magnetic flux φ of the leakage magnetic field from the yoke layer 29 can be interrupted by each of the return path layer 34 disposed on and under the main magnetic pole layer 28 while the recording efficiency can also be improved by concentrating the magnetic flux φ of the recording magnetic field on the front end 28b of the main magnetic pole layer 28, so that the magnetic flux φ of the leakage magnetic field from the yoke can be prevented from flowing into the recording medium and the removing of the recording signal in the approximate track can be effectively prevented.

According to this configuration, the return path layer 34 formed under the main magnetic pole layer 28 may be a magnetic sealed layer disposed under the main magnetic pole layer 28 and not magnetically connected with the main magnetic pole layer 28.

The invention clamed is:

1. A magnetic recording head comprising:
    a main magnetic pole layer and a return path layer;
    a facing surface that faces a recording medium; and
    a coil layer,
    wherein a yoke layer is formed between the main magnetic pole layer and the return path layer,
    an extending front end portion that is formed in the return path layer, and the yoke layer is disposed inside the extending front end portion in a height direction,
    the main magnetic pole layer includes a front end and a rear end, and
    the yoke layer is formed on the surface of the main magnetic pole layer to cover the base.

2. The magnetic recording head according to claim 1, wherein the main magnetic pole layer and the return path layer face each other with a predetermined distance therebetween in a film thickness direction at the facing surface.

3. The magnetic recording head according to claim 1, wherein the coil layer applies a recording magnetic field to the main magnetic pole layer.

4. The magnetic recording head according to claim 1, wherein the yoke layer is magnetically connected with the main magnetic pole layer.

5. The magnetic recording head according to claim 1, wherein the extending front end portion extends toward the main magnetic pole layer.

6. The magnetic recording head according to claim 1,
    wherein the front end of main magnetic pole layer extends inwardly from the facing surface in the height direction with the width size of a track, and
    wherein the rear end of main magnetic pole layer widens from a base formed inside the front end in the height direction and extends inwardly in the height direction.

7. The magnetic recording head according to claim 1,
    wherein a distance between the facing surface that faces the recording medium and a front end of the yoke layer is smaller than a distance between the facing surface that faces the recording medium and the base.

8. The magnetic recording head according to claim 1,
    wherein a front end face of the yoke layer slopes down to the main magnetic pole layer toward the facing surface that faces the recording medium.

9. The magnetic recording head according to claim 1,
    wherein an upper surface of the yoke layer is disposed farther away from the main magnetic pole layer than a lower surface of the extending front end portion.

10. The magnetic recording head according to claim 1,
    wherein at least a portion of the yoke layer and at least a portion of the extending front end portion face each other in a film thickness direction with a gap layer interposed between.

11. The magnetic recording head according to claim 1,
    wherein perpendicular magnetic recording magnetic field is applied to the recording medium by the recording magnetic field applied to the main magnetic pole layer so as to vertically magnetize the recording medium.

* * * * *